US007831597B2

(12) United States Patent
Wu et al.

(10) Patent No.: US 7,831,597 B2
(45) Date of Patent: *Nov. 9, 2010

(54) TEXT SUMMARIZATION METHOD AND APPARATUS USING A MULTIDIMENSIONAL SUBSPACE

(75) Inventors: Yuan-Jye Wu, Issaquah, WA (US); Anne S-W Kao, Bellevue, WA (US); Stephen R. Poteet, Bellevue, WA (US); William Ferng, Sammamish, WA (US); Robert E. Cranfill, Seattle, WA (US)

(73) Assignee: The Boeing Company, Chicago, IL (US)

( * ) Notice: Subject to any disclaimer, the term of this patent is extended or adjusted under 35 U.S.C. 154(b) by 528 days.

This patent is subject to a terminal disclaimer.

(21) Appl. No.: 11/417,196

(22) Filed: May 4, 2006

(65) Prior Publication Data

US 2007/0118518 A1 May 24, 2007

Related U.S. Application Data

(63) Continuation-in-part of application No. 11/281,499, filed on Nov. 18, 2005.

(51) Int. Cl.
*G06F 7/00* (2006.01)
*G06F 17/30* (2006.01)

(52) U.S. Cl. ............... 707/736; 707/772; 707/917; 715/254

(58) Field of Classification Search .............. 707/5, 707/104.1, 736, 772, 917; 715/254
See application file for complete search history.

(56) References Cited

U.S. PATENT DOCUMENTS

| 6,401,086 B1 * | 6/2002 | Bruckner ............... 707/4 |
| 6,424,362 B1 * | 7/2002 | Bornstein et al. ....... 715/854 |
| 6,611,825 B1 | 8/2003 | Billheimer et al. |
| 6,701,305 B1 | 3/2004 | Holt et al. |
| 2002/0052901 A1 * | 5/2002 | Guo et al. .............. 707/531 |
| 2003/0030678 A1 * | 2/2003 | Rosenholtz et al. ..... 345/838 |
| 2003/0172357 A1 | 9/2003 | Kao et al. |
| 2005/0049867 A1 * | 3/2005 | Deane ................... 704/245 |

OTHER PUBLICATIONS

Hovy et al, "Automated Text Summarization and the Summarist System", Annual Meeting of the ACL, Prooceedings of a workshop on held at Baltimore, Maryland, Oct. 13-14, 1998, Session: Text Summarization, pp. 197-214, 1998, Association for Computational Linguistics.*

* cited by examiner

*Primary Examiner*—James Trujillo
*Assistant Examiner*—Marc Somers

(57) ABSTRACT

A text summarizer identifies relevant terms in a document, weights the terms and extracts one or more segments to produce a summary or abstract. The various terms in a particular are weighted in relation to an existing document collection. A term weight computer computes term weights for terms in the document, and a threshold comparator compares the term weights to determine if the corresponding terms are relevant to the document collection. Next, a term weight summer adds the term weights for each occurrence of each relevant term in the various segments of the document, and a summation comparator compares the summations to identify a text summarization segment representative of the document. Optionally, relevant terms can be highlighted in the term summarization segment.

46 Claims, 6 Drawing Sheets

FIG. 4

Network News: Bus bomb explosion wounds 10 in Pakistan

KARACHI, Pakistan - A bomb exploded in Pakistan's southern port city of Karachi, wounding at least 10 people, a senior government official reported.

. . .

The blast badly damaged the bus, which was carrying at least 30 people as it moved through the city's business district, said Zulifgar Ali, a spokesman for the Edhi Foundation, Pakistan's main emergency relief agency. At least three people wounded are in critically condition, the foundation said.

. . .

While there was no claim of responsibility, police believe alQaeda was likely behind the bombing. Karachi has seen a string of alQaeda bombings, including a suicide attack that killed 14 and wounded 27 Pakistanis in front of the U.S. Consulate last June. Another alQaeda bomb killed six French engineers a week earlier.

FIG. 5

Network News: Bus bomb explosion wounds 10 in Pakistan <36.5/5.2>

KARACHI, Pakistan - A bomb exploded in Pakistan's southern port city of Karachi, wounding at least 10 people, a senior government official reported. <36.5/1.82>

. . .

The blast badly damaged the bus, which was carrying at least 30 people as it moved through the city's business district, said Zulifgar Ali, a spokesman for the Edhi Foundation, Pakistan's main emergency relief agency. At least three people wounded are in critically condition, the foundation said. <15.1/0.32>

. . .

While there was no claim of responsibility, police believe alQaeda was likely behind the bombing. Karachi has seen a string of alQaeda bombings, including a suicide attack that killed 14 and wounded 27 Pakistanis in front of the U.S. Consulate last June. Another alQaeda bomb killed six French engineers a week earlier. <255.1/5.1>

FIG. 6

Network News: Bus bomb explosion wounds 10 in Pakistan. While there was no claim of responsibility, police believe alQaeda was likely behind the bombing. Karachi has seen a string of alQaeda bombings, including a suicide attack that killed 14 and wounded 27 Pakistanis in front of the U.S. Consulate last June. Another alQaeda bomb killed six French engineers a week earlier.

TEXT SUMMARIZATION METHOD AND APPARATUS USING A MULTIDIMENSIONAL SUBSPACE

CROSS-REFERENCE TO RELATED APPLICATIONS

This application claims priority to and is a continuation-in-part of U.S. patent application entitled, "Text Summarization Method And Apparatus Using a Multidimensional Subspace," filed Nov. 18, 2005, having a Ser. No. 11/281,499, now pending, the disclosure of which is hereby incorporated by reference in its entirety.

FIELD OF THE INVENTION

The present invention relates generally to data processing. More particularly, the present invention relates to text data processing, for example, creating a summary for each document in a set of one or more documents.

BACKGROUND OF THE INVENTION

A vast amount of information exists in text form, such as free, unstructured, or semi-structured text, including many database fields, reports, memos, email, web sites, and news articles. This information can be of interest to a variety of individuals and entities, such as business managers, market analysts, researchers, private companies, public companies and government agencies. As a result, methods have been developed to analyze textual resources.

Text analysis, or text data analysis, can involve such functions as document classification, document clustering, information visualization, text or document summarization, and document cross-referencing. Text data analysis has adopted certain techniques from the more general field of data analysis, including sophisticated methods for analyzing relationships among highly formatted data, such as numerical data or data with a relatively small fixed number of possible values. Such techniques can expose patterns and trends in the data. Text data analysis can identify relationships between individual free, unstructured or semi-structured text documents, as well as more general semantic patterns across large collections of such documents.

Some methods of text data analysis depend on the twin concepts of "document" and "term." As used in this disclosure, a "document" refers to any body of free, unstructured or semi-structured text. The text can include the entire content of a document in its general sense, such as a book, an article, a paper, or the like- or a portion of a traditional document, such as an abstract, a paragraph, a sentence, or a phrase, for example, a title. Ideally, a "document" describes a coherent topic. In addition, a "document" can encompass text generated from an image or other graphics, as well as text recovered from audio or video formats.

On the other hand, a document can be represented as a collection of "terms," each of which can appear in multiple documents. In some cases, a "term" can consist of an individual word used in the text. However, a "term" can also include multiple words that are commonly used together, for example, "landing gear." Furthermore, the "terms" used to represent a portion of text need not explicitly appear in the text. Thus, the "terms" selected to represent a document may be obtained, for example, by applying acronym or abbreviation expansion, word stemming, spelling normalization, thesaurus-based substitutions, or many other techniques. Selecting the best set of "terms" to represent a given document generally will depend upon the particular document, or a collection to which the document belongs, as well as the specific goals of the text analysis activity.

In vector-based methods of text data analysis, after a suitable set of terms has been defined for a document collection, the collection can be represented as a vector space. With respect to traditional vector space methods, individual documents are treated as vectors in a high-dimensional vector space in which each dimension corresponds to some feature of a document. A collection of documents can thus be represented by a two-dimensional matrix $D_{(t,d)}$ of features and documents. In the typical case, the features correspond to document terms, and the value of each term is the number of occurrences of that term in the specified document. For example, if term $t_1$ occurs four times in document $d_1$, then $D_{(1,1)}$ is set to 4. Similarly, if term $t_2$ does not occur in $d_1$, then $D_{(2,1)}$ is set to 0. More complex types of vector space methods, such as latent semantic indexing (LSI), involve methods of transforming D, e.g. singular value decomposition (SVD) or semi-discrete decomposition (SDD), which typically attempt to provide a more sophisticated set of features and a better measure of the importance of each feature in a document.

By representing documents as vectors in a feature space, similarities between documents can be evaluated by computing the distance between the vectors representing the documents. A cosine measure is commonly used for this purpose, but other distance measures can be used.

The advantages of the vector space method are that it provides a simple and uniform representation of documents and queries, can accommodate many variations appropriate to different document collections, and has been shown to perform relatively well in information retrieval applications. In addition, representing documents as vectors could be useful for other text analysis operations. However, the performance of the basic vector space method is severely limited by the size of D. In actual document collections, both the number of documents and the number of terms are typically quite large, resulting in a large D, and making the necessary distance calculations prohibitively slow. It is possible to alleviate this problem by preselecting a subset of all possible terms to use in the matrix, but this can degrade information retrieval performance and limit text analysis capability. Finally, while the traditional vector space method provides a way of assessing the similarities between documents, it alone does not provide a good way to visualize these relationships or summarize documents.

As disclosed in U.S. Pat. No. 6,611,825, an improved vector space method has been developed that allows the user to efficiently perform a variety of text analysis operations including information retrieval, term and document visualization, term and document clustering, term and document classification, summarization of individual documents in groups of documents, and document cross-referencing. In this technique, the document collection is represented using a subspace transformation based on the distribution and/or number of the occurrence of terms in the documents of the document collection. In particular, a term-by-document frequency matrix D is initially constructed that catalogs the frequencies of the various terms for each of the documents.

In addition, the term-by-document matrix can be preprocessed to define a working matrix A by normalizing the columns of the term-by-document matrix D to have a unit sum, stabilizing the variance of the term frequencies via a nonlinear function and then centering the term frequencies with respect to the mean vector of the columns. This preprocessing is denoted as $A = f(D) - ce^T$ in which c is the mean of the columns of $f(D)$ and e is a d-vector whose components are all equal to one, so that the average of the columns of A is now zero. Each $ij^{th}$ entry in A is therefore a score indicating the relative occurrence of the $i^{th}$ term in the $j^{th}$ document. Traditionally, $f$ is defined as a two-sided weighting function, i.e., $$f(D)=(W_t D)W_d$$

wherein $W_t$ and $W_d$ are two diagonal scaling matrices for weighing terms and documents, respectively, as known to those skilled in the art.

To capture some of the semantics latent in the documents, i.e., to capture similarity of content despite variations in word usage such as the use of synonyms, the working matrix A is orthogonally decomposed and then truncated to k dimensions to obtain a rank-k matrix $A_k$ that approximates A. In this regard, the orthogonal decomposition of the working matrix A can be performed with a number of decompositional techniques, such as a two-sided orthogonal decomposition.

By way of example, one typically two-sided orthogonal decomposition is a truncated URV (TURV) decomposition. For a given dimensionality k, the TURV computes bases of subspaces with high information content (matrices $U_k$ and $V_k$ with orthonormal columns) satisfying the equation:

$$AV_k = U_k R_k,$$

wherein $R_k$ is a triangular matrix of order k. Then an approximate term-document matrix $A_k$ is defined as:

$$A_k = U_k R_k V_k^T$$

For the approximation $A_k$, as well as for A, each row corresponds to a term and each column corresponds to a document. The $ij^{th}$ entry of $A_k$ therefore provides a relative occurrence of the $i^{th}$ term in the $j^{th}$ document, but this relative occurrence has now been filtered by the approximation which captures semantics latent in the documents. More specifically, the factor $U_k$ captures variations in vocabulary, while the factor $V_k^T$ brings out latent structure in the corpus of documents.

As disclosed in U.S. Pat. No. 6,611,825, one can summarize a document by returning all the words with a weight above some threshold in the column corresponding to that document (or if the document is not in the original collection, it can be projected into the subspace obtaining a vector analogous to the column vectors of $A_k$). However, some of these words will not be in the document itself. A person viewing a document will often want to see which words in the document best capture the intrinsic topics of the document or which words in the document are responsible for it being returned by a query. In the case of a keyword query, this is trivial, since in order for it to be returned, the keywords used in the query must occur in the document. However, if one has used the subspace method of document retrieval, then some or all of the words of the query may not occur in the document returned.

Accordingly, it is desirable to provide a method and apparatus that can be used in conjunction with a multidimensional subspace representation of an existing set of documents to analyze an individual document, identify relevant terms and summarize the individual document contents in relation to the content of the existing set of documents or in relation to a specific query.

SUMMARY OF THE INVENTION

The foregoing needs are met, to a great extent, by the present invention, wherein in one aspect an apparatus is provided that in some embodiments can analyze a unit of text data, a document to be summarized or a query that returned that document, with respect to an existing set of documents to identify relevant terms and summarize the document by assigning term weights to each term in the document, comparing the term weights to identify the relevant terms, summing the term weights for each occurrence of the relevant terms in each segment of the document, and comparing the sums of the various segments to select a relevant text summarization segment to represent the document.

In accordance with one aspect of the present invention, a method of summarizing a unit of text data with relation to an existing document collection and, optionally, a query, can include computing a term weight that is representative of the relevance of a term to the unit of text data, or, optionally, to a query which returned that unit of text data, with relation to the document collection, comparing the computed term weight to a predetermined threshold, and returning a relevant term based at least in part on a result of the comparison.

In accordance with another aspect of the present invention, a computer program product for summarizing a unit of text data with relation to an existing document collection and, optionally, a query, including a computer-readable medium encoded with instructions configured to be executed by a processor in order to perform predetermined operations that can include computing a term weight that is representative of the relevance of a term to the document or a query that returned the document, with relation to the document collection, comparing the computed term weight to a predetermined threshold, and returning a relevant term based at least in part on a result of the comparison.

In accordance with yet another aspect of the present invention, a text summarizer can include a term weight computer configured to compute a term weight that is representative of the relevance of a term to a document or a query that returned the document, with relation to the document collection, and a threshold comparator configured to compare the computed term weight to a predetermined threshold. The text summarizer can be configured to return a relevant term based at least in part on a result of the comparison.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is an exemplary document for use with the methods and systems of the present disclosure.

FIG. 5 depicts the document of FIG. 4 having various terms weighted and highlighted, as well as each paragraph scored by a sum of weighted terms as well as by a density score.

FIG. 6 depicts a summary of the document of FIG. 5.

DETAILED DESCRIPTION

Figure 1:
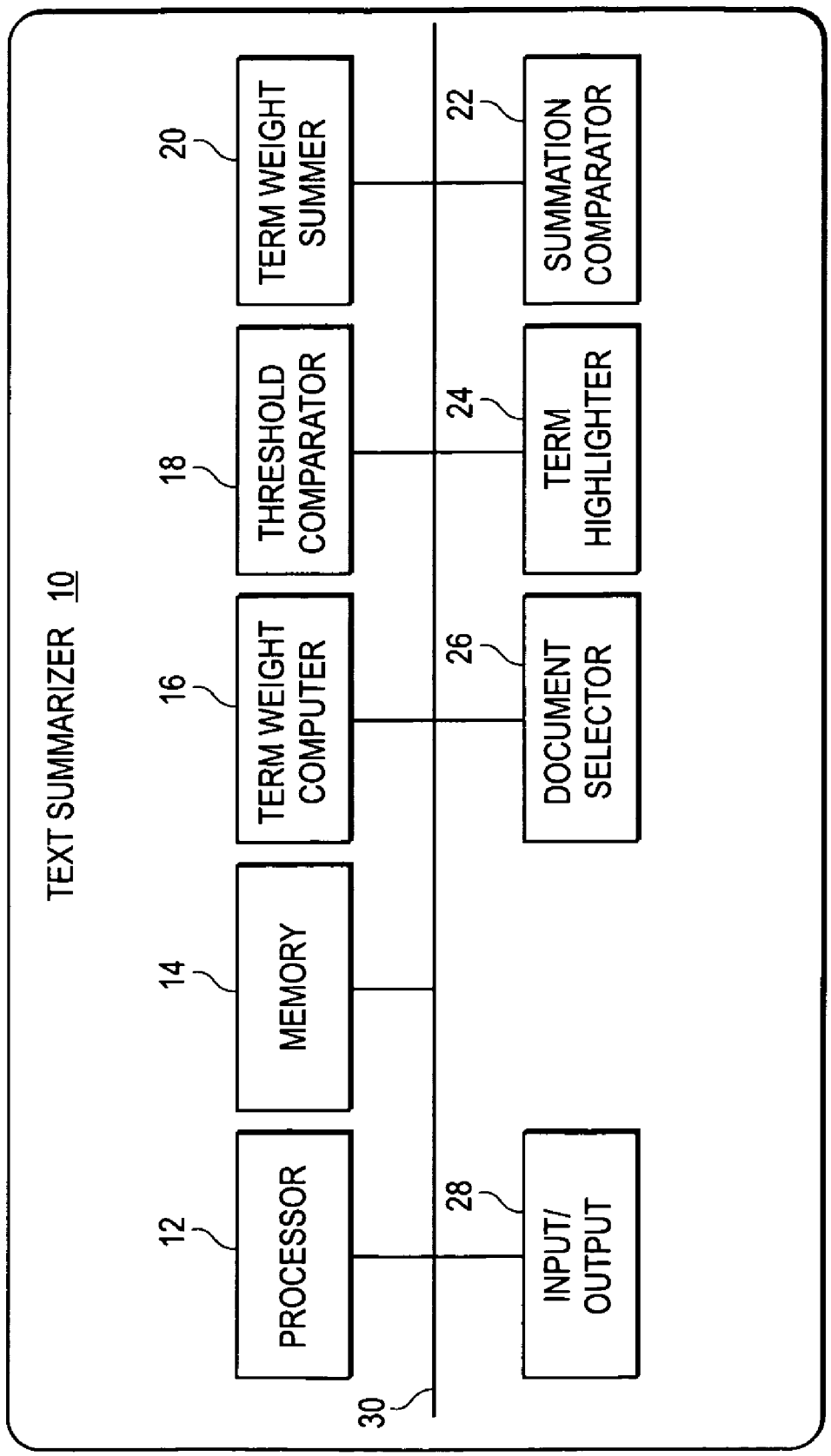
FIG. 1 is a block diagram depicting a text summarizer according to a preferred embodiment of the invention.

An embodiment in accordance with the present invention provides a text summarizer that can identify relevant terms in an individual document with respect to an existing document collection and, optionally, a query. In addition, the text summarizer can analyze and summarize the document in relation to the existing document collection as represented by a multidimensional subspace. The text summarizer can include a term weight computer that computes term weights for terms in the document, and a threshold comparator that compares the term weights to a predetermined threshold to determine whether or not the individual terms are significantly relevant to the document with respect to the document collection.

The text summarizer can also include a term weight summer that adds the individual term weights for each occurrence of each relevant term in each segment of the document, and a summation comparator that computes the sums representing the various segments of the document in order to determine an appropriate text summarization segment to represent the document. The term summarizer can further include a term highlighter that highlights the relevant terms in the text summarization. Moreover, the term summarizer can return the relevant terms and the text summarization, for example, to be displayed for viewing by a user.

The terms may optionally be further based on a query. In this case, the text summarizer can include a document selector to select a document from the document collection that best matches the query.

Throughout this disclosure, the term "document" is used broadly to signify a unit of text data, which is inclusive of merely a portion of a document, such as a section, a paragraph, or a phrase. Use of both the terms "document" and "section of a document" is not meant to distinguish between an entire document and a section of a document, but rather to emphasize, in places, that text including less than a whole document may apply and is expressly included, even though implicitly included throughout the disclosure. In addition, the term "document" can encompass text generated from an image or other graphics, as well as text generated from audio, video or other multimedia formats.

Similarly, the word "term" is used broadly throughout this disclosure to signify a word or a grouping of words that is topically related to a document, a query, or a document collection. However, as used in this disclosure, "term" should not be construed to indicate a single word or phrase that actually appears in the document, query or document collection. That is to say, a "term" may include a word or grouping of words related to the document, query or document collection that nonetheless does not actually appear in the respective medium. For example, the words "car" and "ride" may be considered "terms" in relation to a document, query or document collection, for example, based upon the appearance of the word "automobile" in the document, query or document collection, even though the words "car" and "ride" do not actually appear in the document, query or document collection. Nevertheless, more literal or narrow meanings, significations or interpretations should be understood to be encompassed by the word "term" as used in this disclosure.

Throughout this disclosure, the term "query" is used broadly to signify a word, or group of words, for which a most-closely-related document is to be identified, or for which a group of most-closely-related documents are to be identified. A "term-type query" generally includes relatively few words, which are typically provided, for example, via a user request, whereas an "example-type query" generally includes a relatively larger number words, which can be gleaned, for example, from a text returned in response to a previous query. Thus, the meaning of the term "query" may vary depending on its context, and should not be construed to have a more narrow meaning, signification or interpretation than the broadest possible meaning, signification or interpretation applicable in a particular context.

Throughout this disclosure, the term "segment" is used broadly to signify a unit of text data that is smaller than a related document. A "segment" of a document can be inclusive of any portion of the document, including the entire document, a continuous section, two or more separate sections, a page, a paragraph, a sentence, a phrase or a fixed number of words. In addition, the term "segment" can encompass text generated from an image or other graphics, as well as text generated from audio, video or other multimedia formats.

The invention will now be described with reference to the drawing figures, in which like reference numerals refer to like parts throughout. An embodiment in accordance with the present invention provides a text summarizer for identifying relevant terms and summarizing a document using multidimensional subspace representations of an existing document collection. The method of summarization employed presupposes that a term subspace has been generated via orthogonal decomposition of a document collection representing the domain.

FIG. 1 illustrates a preferred embodiment of a text summarizer 10 including a processor 12, a memory 14, a term weight computer 16, a threshold comparator 18, a term weight summer 20, a summation comparator 22, a term highlighter 24, a document selector 26, and an input/output device 28, all of which are interconnected by a data link 30. The text summarizer 10 can analyze a unit of text data with respect to an existing document collection, including a plurality of text documents previously acquired, selected, known, or otherwise available. Generally, the document collection will consist of a group of related documents with common or similar subject matter.

The processor 12, the memory 14 and the input/output device 28 can be part of a general computer, such as a personal computer (PC), a server, a mainframe computer or a personal digital assistant (PDA). The remaining components can include programming code, such as source code, object code or executable code, stored on a computer-readable medium that can be loaded into the memory 14 and processed by the processor 12 in order to perform the desired functions of the text summarizer 10.

Although the exemplary text summarizer 10 uses a bussed architecture, it should be appreciated that any other architecture may be used as is well known to those of ordinary skill in the art.

Figure 2:
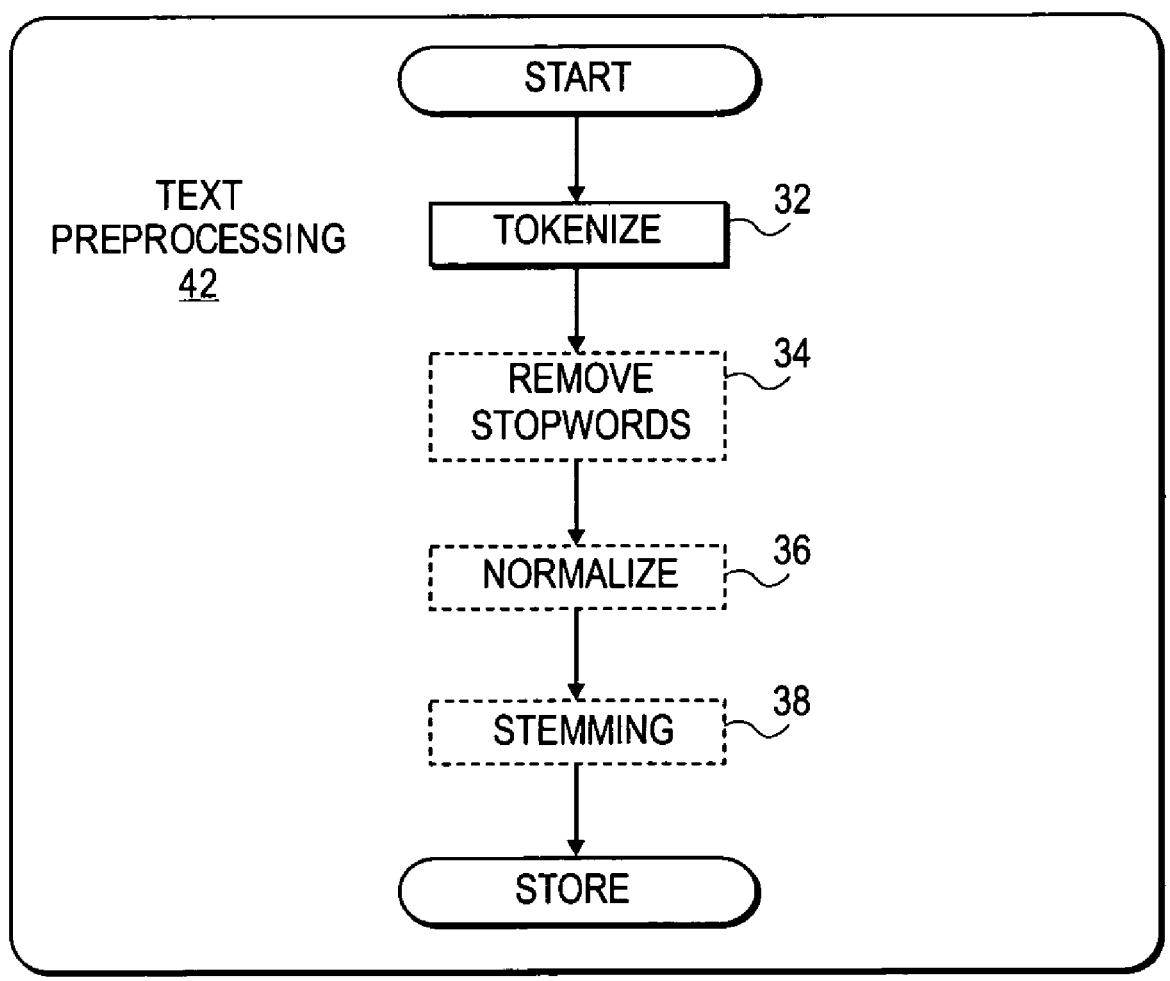
FIG. 2 is a flowchart illustrating steps that may be followed to preprocess a text data document or query.

The term weight computer 16 can compute term weights corresponding to each term in a document, or to each term in the document that is relevant to a domain and, optionally, a query. Initially, the term weight computer 16 can preprocess the text data. FIG. 2 illustrates in detail a process that can be performed by the term weight computer 16, which can prepare, or preprocess, a term list based on the text data. The term list can include all of the terms in the text data, or only those terms that also appear in the original document collection. The preprocessing can preferably be performed on all documents being summarized and on any queries using the same methods that were used for the original document collection. For example, the process of FIG. 2 moves from a start block to step 32 where terms are tokenized according to a tokenizing policy. For example, symbols may represent sequences of letters, letters and numbers, or letters, numbers and certain punctuation like hyphens or slashes, as needed to capture the important terms in the particular domain or the application.

Next, in step 34 stopwords can be removed according to a stopwords policy. This policy may be not to remove any stopwords, thereby making this an optional step. Stopwords are either terms that do not contribute significantly to the overall topic of the documents—such as conjunctions, articles, pronouns, prepositions—or terms that are frequently used throughout the document, and thus do not serve to topically distinguish one document from another. The optimal set of stopwords (i.e., the stopwords policy) for a document generally is the same set that was used for the original document collection.

The process then moves to step 36 where term normalization, standardization or cannonicalization can be performed according to a term normalization policy. The term normalization policy can be based on the document collection. This policy may be not to perform any term normalization, thereby making this an optional step as well. In some embodiments, term normalization can include, for example, acronym expansion (e.g., "COTS" may be the same as "commercial off-the-shelf") or abbreviation expansion (e.g., "ref." may be the same as "reference"). In other embodiments, term normalization can include standardizing hyphenation or nonhyphenation of selected terms, standardizing numbers to either include or omit commas, removing capitalization, or the like.

Additional term normalization may be specific to the original document collection, for example, in a document collection pertaining to different commercial aircraft models, it might be desirable to group model numbers together, e.g., "747" and "737." The term normalization can include any combination of term normalization, including but not limited to those previously listed. Some of the term normalizations may be performed more than one time. The term normalization policy defines the term normalizations and their order of performance for a given document collection.

Next, in step 38, stemming step can be performed according to a stemming policy. The stemming policy can be based on the original document collection. This policy may be not to perform stemming, thereby making this an optional step also. Stemming eliminates conjugated forms of a word, e.g., "es," "ed," and "ing" and keeps only the root word. Care must be taken when performing stemming; for example, it would not be desirable to change "graphics" to "graph" or "Boeing" to "Boe."

Depending on whether the terms are based on a query, and if so, depending on the type of query, the term weight computer 16 can compute the term weights in various manners. For example, in order to compute term weights for a document or for an example-type query, the term weight computer 16 can initially compute a vector representation of the document (if the document has not been previously projected in the term subspace) or of the example-type query.

Referring again to FIG. 1, the term weight computer 16 can count the number of occurrences of each of the terms from the preexisting document collection within the text data to produce a term frequency. Each of the term frequencies can form a term in a term frequency vector that includes the same terms and the same order as the columns of the original document collection matrix or multidimensional term subspace matrix.

In addition, the term weight computer 16 can perform a statistical transformation on the term frequency vector according to the statistical transformation policy used in creating the preexisting document collection matrix. The statistical transformation policy may be not to perform any statistical transformations, thereby making this an optional step. However, improved results may be achieved through statistical transformation, since obtaining a relative frequency and stabilizing the variance of the sampling frequencies make the term frequencies more comparable to each other from one document to another.

For example, the term weight computer 16 may perform a proportioning transformation, dividing a raw term frequency by the sum of the term frequencies of the document in order to obtain a relative term frequency. As another example, the term weight computer 16 may apply a transformation algorithm to the data in order to stabilize the variance of the sampling frequencies, making terms with radically different frequencies more comparable. An example of such a transformation algorithm includes taking the arcsin of the square root of the relative term frequencies.

The term weight computer 16 can transform the vector representation of the document or example-type query into a projection in a previously determined multidimensional subspace representing the existing document collection, using a method such as that described in U.S. Pat. No. 6,611,825, entitled "Method and System for Text Mining Using Multi-dimensional Subspaces," issued to Billheimer et al. on Aug. 26, 2003, the disclosure of which is hereby incorporated by reference in its entirety. That is, as with existing latent semantic indexing methods, once a decomposed term matrix representation, or term subspace, has been determined for an existing document collection as discussed above, an additional document or query can be projected in the same subspace. This allows the similarities and differences between the document or query terms and the terms in the document collection to be quantified.

In the case that the text summarizer 10 determines that a query is a term-type query, the term weight computer 16 can compute term weights for each of the query terms in a variety of ways, e.g., by calculating relationship values representing the similarities or differences between the query terms and the document collection terms in the original document collection matrix term space.

For example, the term weight computer 16 can assign each of the preprocessed query terms—such as individual words or combinations of related words—that exists in the precomputed term-term matrix, or relationship table ($U_k \times U_k^T$), a relationship value based on the components, or coefficients, of the corresponding row vector, which represent the strength of the relationships between the query term and the original terms of the document collection. For example, the components of the corresponding row vector can be summed to calculate the relationship value for the query term. In some embodiments, a weighting factor, for example, based on the frequencies of the terms in the original document collection, can be applied to the components of the row vector before these are summed.

In the context of this disclosure, similarity in content, or relatedness, refers to commonalities in subject matter, topics, or events—not merely commonalities in similar terms. For example, two documents that both include the terms "2007," "Saturn," "vehicle," "project," and "launch" may not be similar in content by the fact that one document could refer to a NASA project with the goal of launching a space exploration vehicle to study the atmosphere of the planet Saturn before the end of the year 2007, while the other document could discuss design efforts by the Saturn Corporation to launch a new automobile model in 2007. Thus, similarity in content refers to documents regarding the same subject matter, topics, or events, which will typically also include common or similar terms as a consequence of content similarity.

Once term weights corresponding to each term in the document or query have been assigned, the threshold comparator 18 can compare the term weights assigned by the term weight computer 16 for each term that actually appears in the selected document to a predetermined threshold value in order to make a determination as to whether each term is relevant to the existing document collection. For example, in one embodiment, if an assigned term weight is greater than the threshold, the term is sufficiently related to the existing document collection to be considered a relevant term. In various embodiments, the threshold can be determined, for example, in accordance with the specific requirements of a particular application. Significantly, the relevant terms can identify the terms that result in a particular document being selected as a best match to a specific query.

Depending at least in part on the outcome of the threshold comparison performed by the threshold comparator 18, the text summarizer 10 can "return" relevant terms. In one embodiment, the relevant terms can be returned, for example, to another module or routine within the text summarizer 10. In an alternative embodiment, the relevant terms can also be returned to a display, for example, to be viewed by a user. The relevant terms can further be divided into distinct classifications, or categories, depending on the relatedness of each term to the content of the document collection. For example, the threshold comparator 18 can include multiple predetermined thresholds having different values that represent varying levels of relatedness, and the threshold comparator can compare each term weight to each of the thresholds to classify each term and group the relevant terms into groupings based on the classifications. Thus, the text summarizer 10 can return a single grouping of relevant terms, or various groupings of terms with varying levels of relatedness to the document collection.

If, on the other hand, a term weight is determined to be not relevant to the existing document collection, the text summarizer 10 can place the irrelevant term in a separate category or classification. In an alternative embodiment, the term summarizer 10 can simply discard, or automatically delete, irrelevant terms.

Referring again to FIG. 1, the term weight summer 20 can sum or add the term weights of the corresponding relevant terms in a segment of the document. For example, for each segment of the document, such as a paragraph or a sentence, the term weight summer 20 can add the term weight value assigned to a relevant term for each occurrence of that term within the given segment. After adding the term weights for each occurrence of all of the relevant terms in a segment, the term weight summer 20 can store the total, or summation, for that segment.

The summation comparator 22 can compare the totals of the various segments in the document to each other to rank or score the individual segments according to the number of relevant terms within each segment and the term weights assigned to those terms. In this way, the text summarizer 10 can determine which of the segments within a document are most representative of that document with regard to the contents of the existing document collection and, optionally, the query.

In various embodiments, especially where the segments are not of fixed length, it may be beneficial to further factor in segment length to such a segment "score," that is, to consider the density of terms as well as the sum of weights for each segment. For example, if two paragraphs each have a sum of weighted terms of 20, but the second paragraph contains half the total words (with or without stop words being accounted for), it might be beneficial to use the second paragraph in a summary as opposed to the first.

In addition, it can be advantageous to factor in a sum of weighted terms score with various other factors. For example, in some embodiments the summation comparator 22 can factor in a weighting based on text position, such as whether the segment is the first or last paragraph of a document or subsection/chapter; a weighting based on the proximity of the segment to the first paragraph, last paragraph, etc.; or a weighting based on text found in special sections, such as a header, abstract, etc., or text found in metadata fields.

Still further, weighting may be based on font characteristics, such as font size, bold, italics, underline, etc. Likewise, weighting may be further based on certain associations, for example, text associated with figures or graphs, as well as any other known or later recognized attribute of text that may relate information or significance.

The text summarizer 10 can thus select a segment of text from the document, or multiple segments of text from the document, to represent the document as a text summarization. In some embodiments, it can be beneficial to combine several discontinuous segments from different portions of a document to form the summarization. For example, the text summarizer 10 can concatenate the three highest-scoring sentences in the document to form a summarization.

The text summarizer 10 can "return" the selected segment or segments as a text summarization. For example, in one embodiment, the text summarizer 10 can return the most relevant segment or a group of most relevant segments to another module or routine of the text summarizer 10. Similarly, in an alternative embodiment the text summarizer 10 can return the text summarization segment to a display, for example, to be viewed by a user.

In addition, the term highlighter 24 can highlight relevant terms within either the text summarization segment or the entire document for display, for example, to be viewed by a user. For example, the term highlighter 24 can mark a relevant term for highlighting, such as with a background color, boldface print, or a different colored font. In addition, the term highlighter 24 can use various types of highlighting and effects for different classifications, or categories, of relevant terms. For example, in one embodiment, relevant terms can be separated into three categories: high, medium and low relevance. Then, the terms of high relevance can be highlighted with a yellow background and printed in boldface type. Similarly, the medium relevance terms can be highlighted with the same or a different background color and displayed in a different font color. Likewise, the low relevance terms can be displayed in yet another font color, for example, without background highlighting. In this way, the user can quickly and efficiently identify relevant terms, including terms of varying levels of relevance, within a text summarization segment on a display.

Referring again to FIG. 1, in the case of an analysis based on a query, the document selector 26 can select, or identify, and retrieve a particular document from among the documents in the existing document collection that best matches the query—that is, the document that is most closely related to or is most similar to the query. For example, the document selector 26 can use an information retrieval method disclosed in U.S. Pat. No. 6,701,305, entitled "Methods, Apparatus and Computer Program Products for Information Retrieval and Document Classification Utilizing a Multi-Dimensional Subspace," issued to Holt et al., on Mar. 2, 2004, the disclosure of which is hereby incorporated by reference in its entirety. In other embodiments, a group of most closely related documents can be identified, and optionally ranked according to their relation to the query. The selected document or documents can then be used for identification of relevant terms and text summarization, as described above.

Figure 3:
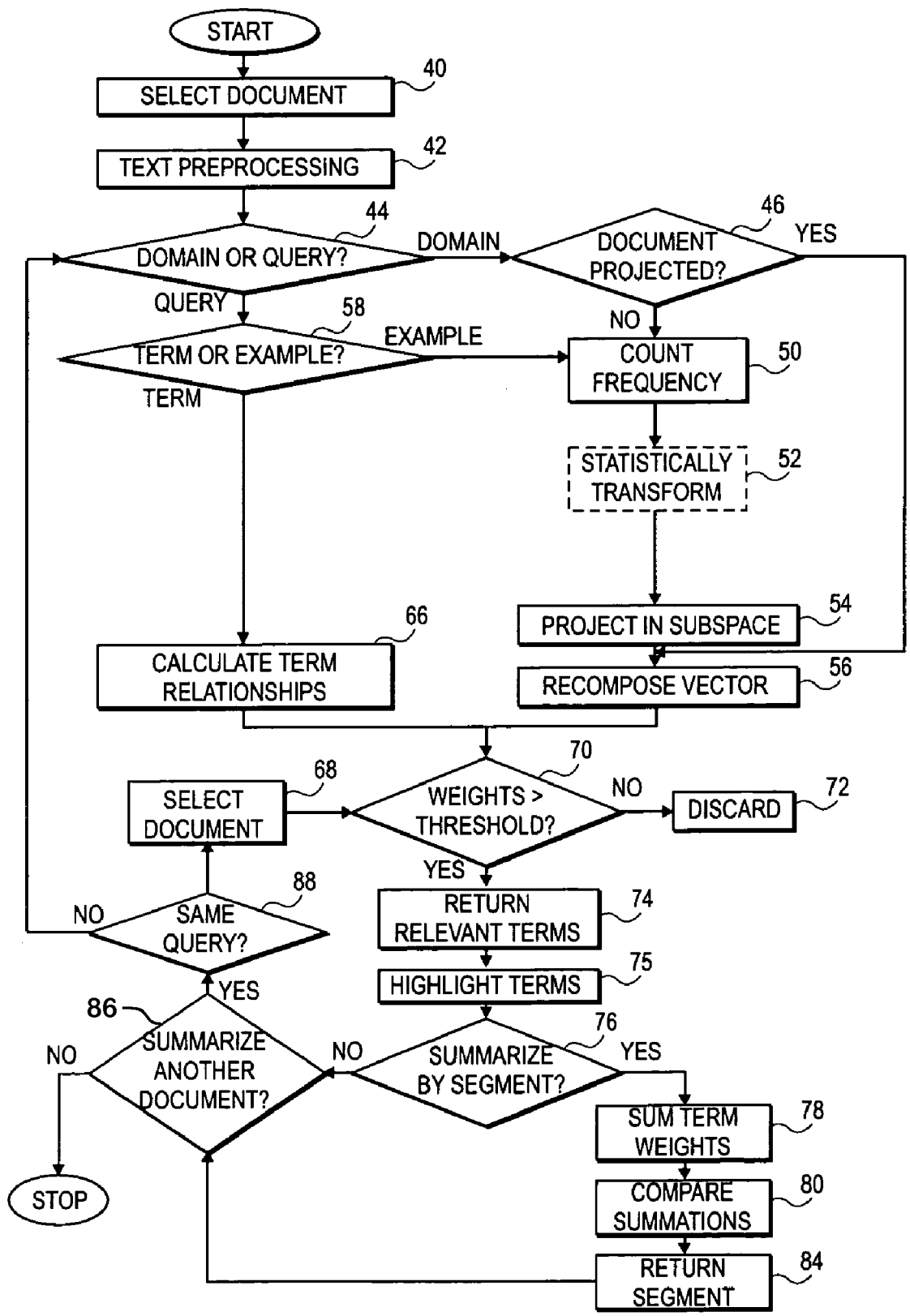
FIG. 3 is a flowchart illustrating steps that may be followed in accordance with one embodiment of the text summarization method or process.

FIG. 3 is a flowchart illustrating a sequence of steps that can be performed by the text summarizer 10 of FIG. 1 in order to perform text summarization on a text data document. The process begins with step 40 selecting a document for summarization. A user may request the system to summarize a document by picking the document out directly without first posting a query or by posting a query and selecting a document from the query's returned list of documents. Then the process proceeds to step number 42, "text preprocessing," where the text data can be prepared as described above with reference to FIG. 2, steps 32 through 38.

Subsequently, in step 44, "domain or query?", in which the text summarizer 10 can determine whether a domain-driven (non-query-driven) text summarization or query-driven text summarization is to be performed. If the term summarizer 10 determines that domain-driven text summarization is to be performed, the process continues to step 46, "document projected?", in order to determine whether the document or query to be analyzed has been previously projected in the subspace associated with the existing document collection. If the document or query has not been previously projected in the subspace, control moves to step 50, "count frequency," where the number of occurrences of each of the terms from the preexisting document collection within the text data count be quantified to compute an original term space vector representation, or term frequency vector, as explained above.

Returning to step 44, "domain or query," if a query-driven text summarization is to be performed, the process continues to step 58, "term or example," to determine what type of query is to be used, an example-type query or a term-type query. If a example-type query is to be used, control continues to step 50, "count frequency," and the number of occurrences of each of the terms from the preexisting document collection within the text data count can be quantified to compute an original term space vector representation, or term frequency vector, as explained above.

In either the domain-driven or the example-type query-driven case, control passes from step 50 to step 52, "statistically transform," a statistical transformation can be performed on the term frequency vector according to the statistical transformation policy used in creating the preexisting document collection matrix, as described above. The process then continues to step 54, "project in subspace," where the vector representation of the document or example-type query can be transformed into a projection in the previously determined multidimensional subspace representing the existing document collection. This step can be performed according to the method described in U.S. Pat. No. 6,611,825, as discussed above.

Subsequently, in step 56, "recompose vector," the projection in the lower dimensional subspace can be transformed into a vector in the original term space that approximates the vector representation in the original term space that was originally projected in the subspace. For example, in order to recompose the vector representation in step 56, the subspace projection can be projected back into the original term space by left multiplying the projection by $U_k$, which has been described above. The coefficients of the recomposed vector can then be used as term weights, or term weights can be calculated based on the coefficients of the recomposed vector.

However, the recomposed vector representation will include additional terms not actually appearing in the original document or query that are related to the terms of the original document or query in light of the existing document collection. In other words, information regarding the relationships of the semantic content of the original document collection will be carried back during the recomposition of the vector in the original term space, adding information to the recomposed vector representation regarding additional terms in the document collection that are related to those actually appearing in the original document or query. In this manner, the recomposed vector coefficients can include relationships between the document or query terms and related terms of the existing document collection, including relationships established by the semantic content of the existing document collection regarding terms not actually found in the document or query.

Returning once again to step 58, "term or example," if a term-type query is to be used in the analysis, the process instead continues to step 66, "calculate term relationships," in which term weights for the query terms can be computed by calculating relationship values representing the similarities or differences between each of the query terms and the existing document collection terms in the original term space, as discussed above.

While the present systems and methods use a sum of weighted terms approach, it should be appreciated that other approaches may be used. For example, in various embodiments an artificial neural network or fuzzy logic might be applied, while in other approaches a particular parametric equation or statistically-based approach might be applied.

The term weights that result from step 56 or from step 66 can then be compared, in step 70, to a predetermined threshold, or various predetermined thresholds, to determine whether each of the corresponding terms is a relevant term, or to classify the various terms in categories of varying relevance. For example, in a preferred embodiment, if a term weight value is less than the predetermined threshold value, the corresponding term is not relevant and can be discarded, or automatically deleted, in step 72. Nevertheless, in an alternative embodiment, irrelevant terms may be stored, or user input may be requested to determine an appropriate action. In a preferred embodiment, with regard to an example-type query, only those term weights corresponding to terms that also are associated with the selected document to be summarized are compared.

On the other hand, if a term is determined to be relevant—that is, in a preferred embodiment, if the corresponding term weight value is determined to be greater than the predetermined threshold value in step 70—the process continues to step 74, in which the text summarizer 10 can return the relevant terms, for example, to another module of the text summarizer 10 or to a display for viewing by a user. The relevant terms can be displayed, for example, as a single category of relevant terms or as multiple categories of varying relevance levels, such as high, medium and low relevance.

Next, in step 75, the relevant terms that appear in the document can be highlighted. That is, the relevant terms can be flagged to appear in a display with a distinguishing marking, such as background highlighting, boldface type, a different font color, or the like, to distinguish the relevant terms from the general text in the document. In the case that multiple thresholds are used in step 70 to identify various categories of relevant terms with varying levels of relevance to the document or query, the separate categories of relevant terms can be highlighted differently to allow a user to quickly and efficiently distinguish the varying levels of relevance. In other embodiments, highlighting of relevant terms can be done just on the terms in the segment or segments selected as a summary of the document in step 80.

The text summarizer 10 next determines in step 76 whether the document is to be summarized by a segment of the document. If the document is to be summarized, the process continues to step 78, "sum term weights," in which the term weights corresponding to the relevant terms that appear in each segment of the document can be added together for each appearance of each relevant term in the segment to generate a total, or summation, that can be used as a score to rank the segments with respect to each other. The summations of each of the segments of the document are then compared in step 80, "compare summations," to rank the scores in order, for example, from highest to lowest. The segment with the highest score, for example, can be identified as a text summarization segment to represent the document, or multiple segments with the highest scores can be identified as text summarization segments to represent the document.

Then, in step 84, "return segment," the text summarization segment or segments can be returned by the text summarizer 10, for example, to another module or routine of the text summarizer 10, or to a display for viewing by a user.

After performing step 84, the process proceeds to step 86, in which the text summarizer 10 determines whether the process is to continue. If the process has reached an end, or an end command has been received in step 86, the process stops. Otherwise if the process is to continue, or an end command has not been received, the text summarizer 10 can determine in step 88 whether the same query is to be used for continuing text summarization analysis, in the case that the previous analysis was based on a query.

Then, if the same query is to be used, the text summarizer 10 can return to step 68, "select document," (which is similar to the process in step 53 except that it involves selecting a new document from the list returned by the query) and can continue through an additional cycle of the process to identify relevant terms in the new document in steps 70 through 74, and optionally summarize the new document by segment in steps 76 through 84. On the other hand, if the same query is not to be used for continued text summarization analysis, as determined in step 88, or if the previous analysis was not based on a query, the text summarizer can return instead to step 55 to select another document, either with a new query or without a query, and so on.

FIG. 4 is an exemplary document for use with the methods and systems of the present disclosure. As shown in FIG. 4, the exemplary document contains a number of sentences and paragraphs. For the purpose of this example, each paragraph can be considered a segment for consideration. FIG. 5 depicts the document of FIG. 4 having various terms weighted and highlighted, with heavily weighted terms bolded and underlined and lightly weighted terms merely bolded. While the present example has but two forms of highlighting, it should be appreciated that this is merely for ease of explanation and any number and classes of weights and highlighting can be used.

Also shown at the end of each segment/paragraph a <score/density> is provided. As shown in FIG. 5, the <score/density> for the first paragraph is <36.5/5.2>, for the second paragraph is <36.5/1.82>, for the third paragraph is <15.1/0.32> and for the last paragraph is <255.1/5.1>.

FIG. 6 depicts a summary of the document of FIG. 5 assuming a hypothetical density threshold of 5.0 is applied. That is, given that the density of the first and last paragraph exceed 5.0, they are excerpted and concatenated to provide the summary of FIG. 6. While the present example uses a sum of weighted terms approach based on the frequency and density of terms, as described above, it should be appreciated that any number of other factors, such as text position and font type, can also be used to determine an appropriate summary.

FIGS. 1, 2 and 3 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 1 depicts the apparatus of one embodiment including several of the key components of a general purpose computer by which an embodiment of the present invention may be implemented. Those of ordinary skill in the art will appreciate that a computer can include many more components than those shown in FIG. 1. However, it is not necessary that all of these generally conventional components be shown in order to disclose an illustrative embodiment for practicing the invention. The general purpose computer can include a processing unit 12 and a system memory 14, which may include random access memory (RAM) and read-only memory (ROM). The computer also may include nonvolatile storage memory, such as a hard disk drive, where additional data can be stored.

An embodiment of the present invention can also include one or more input or output devices 28, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) or a wide area network (WAN), and can include all of the necessary circuitry for such a connection. In one embodiment of the present invention, the document collection includes documents received over the Internet. Other embodiments are possible, including: a local document collection, i.e., all documents on one computer, documents stored on a server or a client in a network environment, etc.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of summarizing a first unit of text data with relation to an existing document collection, comprising:
    computing a term weight that is representative of the relevance of a term to a second unit of text data with relation to the existing document collection;
    performing one of a domain driven text summarization, an example type query driven text summarization, and a term type query driven text summarization on a selected document;
    recomposing a vector representation of at least one of the first and second units of text data in a predetermined multidimensional subspace representing the existing document collection when performing domain driven text summarization or example type query driven text summarization, the recomposing being performed by projecting the vector representation back into an original term space of the existing document collection;
    computing a relationship of the term to the terms in a query using a term-term matrix associated with the original term space when performing term type query driven text summarization;
    comparing the computed term weight to a predetermined threshold; and
    returning a relevant term based at least in part on a result of the comparison.

2. The method of claim 1, further comprising:
    summing a plurality of relevant term weights based on a number of occurrences of a plurality of corresponding relevant terms in a segment of the first unit of text data;
    comparing a plurality of summations based on a plurality of corresponding segments of the first unit of text data to identify a text summarization segment; and
    returning the text summarization segment.

3. The method of claim 2, further comprising highlighting the relevant term in the returned text summarization segment.

4. The method of claim 1, wherein the first unit of text data includes a document.

5. The method of claim 1, wherein the second unit of text data is the same as the first unit of text data.

6. The method of claim 1, wherein the second unit of text data is a query.

7. The method of claim 6, further comprising selecting as the first unit of text data a relevant document from the document collection based at least in part on the query.

8. The method of claim 1, wherein the original vector representation is based at least in part on the first unit of text data.

9. The method of claim 1, wherein the original vector representation is based at least in part on a query.

10. The method of claim 1, wherein the subspace is determined in part by an orthogonal decomposition of a term-by-document matrix representation of the document collection.

11. The method of claim 1, wherein the step of computing further comprises computing an original vector representation in the original term space and transforming the original vector representation into a projection in a predetermined vector subspace.

12. The method of claim 11, wherein the step of computing the original vector representation further comprises performing at least one selected from the following: tokenizing a first term according to a predetermined tokenizing policy, removing a second term according to a predetermined stopword policy, removing a third term according to a predetermined low frequency term policy, normalizing a fourth term according to a predetermined normalization policy, and stemming a fifth term according to a predetermined stemming policy.

13. The method of claim 11, wherein the step of computing the original vector representation further comprises counting a number of occurrences of a term to determine a term frequency.

14. The method of claim 13, wherein the step of computing the original vector representation further comprises statistically transforming the term frequency according to a predetermined statistical transformation policy.

15. The method of claim 1, further comprising:
    determining whether the domain or query driven text summarization is selected for a selected document;
    determining whether the document to be analyzed has been previously projected in the subspace associated with the existing document collection when the domain driven text summarization is selected;

determining whether the term type query or the example type query is to be used when query driven text summarization is selected;

computing a vector using a unit of text data when example type query is selected or the document is projected;

computing the term relationships when term type query is selected;

transforming a vector representation of the document or example-type query into a projection in the previously determined multidimensional subspace representing the existing document collection; and recomposing the vector by having the projection in the lower dimensional subspace being transformed into the vector in the original term space.

16. A computer program product for summarizing a first unit of text data with relation to an existing document collection, the computer program product including a computer-readable medium encoded with computer program instructions, wherein the computer program instructions, when executed by a processor, cause the processor to perform predetermined operations comprising:

computing a term weight that is representative of the relevance of a term to a second unit of text data with relation to the existing document collection;

performing one of a domain driven text summarization, an example type query driven text summarization, and a term type query driven text summarization on a selected document;

recomposing a vector representation of at least one of the first and second units of text data in a predetermined multidimensional subspace by projecting the vector representation back into an original term space of the existing document collection when performing domain driven text summarization or example type query driven text summarization;

computing a relationship of the term to the terms in a query using a term-term matrix associated with the original term space when performing term type query driven text summarization;

comparing the computed term weight to a predetermined threshold; and returning a relevant term based at least in part on a result of the comparison.

17. The computer-implemented method of claim 16, further comprising:

summing a plurality of relevant term weights based on a number of occurrences of a plurality of corresponding relevant terms in a segment of the first unit of text data;

comparing a plurality of summations based on a plurality of corresponding segments of the first unit of text data to identify a text summarization segment; and returning the text summarization segment.

18. The computer program product of claim 17, wherein the predetermined operations further comprise highlighting the relevant term in the returned text summarization segment.

19. The computer program product of claim 16, wherein the first unit of text data includes a document.

20. The computer program product of claim 16, wherein the second unit of text data is the same as the first unit of text data.

21. The computer program product of claim 16, wherein the second unit of text data is a query.

22. The computer program product of claim 21, wherein the predetermined operations further include selecting as the first unit of text data a relevant document from the document collection based at least in part on the query.

23. The computer program product of claim 16, wherein the step of computing further comprises calculating a relationship value indicative of a relationship between a query term and the document collection.

24. The computer program product of claim 16, wherein the original vector representation is based at least in part on the first unit of text data.

25. The computer program product of claim 16, wherein the original vector representation is based at least in part on a query.

26. The computer program product of claim 16, wherein the subspace is determined in part by a decomposed term matrix representation of the document collection.

27. The computer program product of claim 16, wherein the step of computing further comprises computing an original vector representation in the original term space and transforming the original vector representation into a projection in a predetermined vector subspace.

28. The computer program product of claim 27, wherein the step of computing the original vector representation further comprises performing at least one selected from the following: tokenizing a first term according to a predetermined tokenizing policy, removing a second term according to a predetermined stopword policy, removing a third term according to a predetermined low frequency term policy, normalizing a fourth term according to a predetermined normalization policy, and stemming a fifth term according to a predetermined stemming policy.

29. The computer program product of claim 27, wherein the step of computing the original vector representation further comprises counting a number of occurrences of a term to determine a term frequency, and statistically transforming the term frequency according to a predetermined statistical transformation policy.

30. The computer program product of claim 16, further comprising:

determining whether the domain or query driven text summarization is selected for a selected document;

determining whether the document to be analyzed has been previously projected in a subspace associated with an existing document collection when the domain driven text summarization is selected;

determining whether the term type query or the example type query is to be used when query driven text summarization is selected;

computing a vector using a unit of text data when example type query is selected or the document is projected;

computing the term relationships when term type query is selected;

transforming a vector representation of the document or example type query into a projection in the subspace representing the existing document collection; and recomposing the vector by having the projection in the lower dimensional subspace being transformed into the vector in the original term space, with the computing of the term weight that is representative of the relevance of the term to a second unit of text data with relation to the existing document collection, being from the recomposing of the vector or the computing of term relationships.

31. A text summarizer, comprising:

a computer readable medium;

a term weight computer configured to compute a term weight that is representative of the relevance of a term to a document collection from an input involving latent semantic indexing;

using a term-term matrix associated with an original term space when performing term type query driven text summarization, or subspace transformation and projection when performing domain driven text summarization or example type query driven text summarization; and a threshold comparator stored on the computer readable medium and configured to compare the computed term weight to a predetermined threshold, wherein the text summarizer is configured to return a relevant term based at least in part on a result of the comparison.

32. The text summarizer of claim 31, further comprising:

a term weight summer stored on a computer readable medium configured to sum a plurality of relevant term weights based on a number of occurrences of a plurality of corresponding relevant terms in a segment of text data; and a summation comparator stored on a computer readable medium and configured to compare a plurality of summations based on a plurality of corresponding segments of text data to identify a text summarization segment, wherein the text summarizer is configured to return the text summarization segment.

33. A method for creating a summary with relation to an existing document collection having one or more documents based on a query, comprising:

receiving query information from a user after creating a subspace for the existing document collection;

performing one of a domain driven text summarization, an example type query driven text summarization, and a term type query driven text summarization on a selected document in the existing document collection;

recomposing a vector representation of the query in the subspace by projecting the vector representation of the query back into the original term space when performing domain driven text summarization or example type query driven text summarization;

computing a relationship of the term to the terms in the query using a term-term matrix associated with an original term space of the existing document collection when performing term type query driven text summarization;

identifying a first document segment of a first document of the document collection, wherein the first document segment is substantially optimized to represent a summary of the first document in relation to the query information based on a weighting process of tokens within the document, the weighting process being based on the computing of the term relationships or on a subspace transformation of the query information, the subspace being based on a number of occurrences of tokens in the documents of the existing document collection; and returning the first document segment of the first document to the user.

34. The method of claim 33, wherein the step of identifying a text summarization segment includes computing one or more token weights for each of the document tokens, each weight being representative of the relevance of a respective token to the query information with relation to the document collection.

35. The method of claim 34, wherein the step of identifying a text summarization segment further includes:

identifying a plurality of different document segments of the first document;

calculating a respective sum for each document segment to create a plurality of sums, each sum being based on the query token weights and on the occurrences of the corresponding query tokens in a respective document segment; and identifying a high-scoring document segment based on the plurality of sums.

36. The method of claim 35, further comprising highlighting one or more terms related to the query in the returned text summarization segment.

37. The method of claim 36, wherein the form of highlighting of each highlighted term is based upon the respective computed weight.

38. The method of claim 34, wherein the step of identifying a text summarization segment further includes:

identifying one or more secondary tokens having a known relation to at least one of the query tokens; and computing a secondary token weights for each of the secondary tokens, each secondary weight being representative of the relevance of a secondary token to the document collection.

39. The method of claim 38, wherein the step of identifying a text summarization segment further includes:

identifying a plurality of different document segments of the first document;

calculating a respective sum for each document segment to create a plurality of sums, each sum being based on the query token weights, the secondary token weights and on the occurrences of the corresponding query terms and secondary terms in a respective document segment; and identifying one or more high-scoring document segment based on the plurality of sums.

40. The method of claim 39, further comprising highlighting at least one of a query term and a secondary term in the returned text summarization segment.

41. The method of claim 40, wherein the form of highlighting of each highlighted term is based upon the respective computed weight.

42. The method of claim 34, wherein the step of computing one or more token weights for the query terms includes recomposing a vector representation in the original term space, the vector representation being based at least in part on a projection of an original vector representation in a predetermined vector subspace.

43. The method of claim 33, wherein the query information is at least one of a sample document and a set of one or more distinct and separate terms provided by a user.

44. The method of claim 33, wherein the query information is derived from a specific document in the set of documents.

45. The method of claim 33, wherein there is a plurality of documents in the set of one or more documents.

46. The method of claim 33, further comprising:

determining whether the term type query or the example type query is selected when query information is received;

calculating the term relationships when term-type query is selected and computing and recomposing the vector representation when example-type query is selected, utilizing a projection to the subspace generated before the query.

* * * * *